UNITED STATES PATENT OFFICE.

NEIL E. MORGAN, OF HERMON, NEW YORK, ASSIGNOR TO BOB WHITE CHEMICAL CORPORATION, OF NEW YORK, N. Y., A CORPORATION OF NEW YORK.

INSECTICIDE.

1,405,856. Specification of Letters Patent. Patented Feb. 7, 1922.

No Drawing. Application filed September 13, 1919. Serial No. 323,618.

*To all whom it may concern:*

Be it known that I, NEIL E. MORGAN, a citizen of the United States, residing at Hermon, in the county of St. Lawrence and State of New York, have invented certain new and useful Improvements in Insecticides, of which the following is a specification.

This invention relates to certain improvements in insecticides and has relation more particularly to a liquid composition wherein the ingredients are of a character whereby the composition operates as a life destroying agent and as a repellent, and it is primarily an object of the invention to provide a novel and improved liquid insecticide or destroyer wherein cresylic is in solution with an oil, the cresylic acid operating as a life destroying agent and the oil operating to eliminate blistering action of the acid when applied and also to prevent rapid evaporation of the acid.

The cresylic acid also operates as a repellent and, when desired, the oil may be aromatic, so that the oil may also serve as a repellent. The oil employed may be mineral, petroleum, creosote, vegetable, whale, fish or the like and either separate or in combination, and the amount of cresylic acid must be of a proportion not less than 1% of the mixture.

My improved liquid insecticide or destroyer is particularly adapted for use in the destruction of lice, flies and other vermin or insects on farm stock and poultry and for spraying of poultry houses, dairy barns or similar structures for the destruction of such vermin or insects.

A particular feature of my improved composition is that it is unsaponified, and the same is applied in the form of mist or spraying.

I claim:

1. An insecticide constituting a composition consisting of cresylic acid in an oily vehicle, the cresylic acid comprising a relatively minute part of the composition.

2. An insecticide constituting a composition consisting of cresylic acid in an oil vehicle, the cresylic acid being of a quantity not less than one per cent of the mixture.

In testimony whereof I hereunto affix my signature.

NEIL E. MORGAN.